Patented Jan. 12, 1937

2,067,859

UNITED STATES PATENT OFFICE 2,067,859

SYNTHETIC RESIN AND METHOD OF PRODUCING

Ernest G. Peterson, Wilmington, Del., assignor to Hercules Powder Company, Wilmington, Del., a corporation of Delaware No Drawing. Application September 2, 1933,
Serial No. 688,069

21 Claims. (Cl. 260—2)

This invention relates to a new composition of matter and method for its production.

In accordance with this invention a novel synthetic resin, having characteristics rendering it valuable for use variously in the commercial arts, is prepared by reacting together maleic anhydride, rosin or abietic acid, and a terpene hydrocarbon possessing no conjugated system of double bonds or equivalently a terpene cut comprising largely one or a mixture of terpene hydrocarbons possessing no conjugated system or double bonds.

Generally speaking, the terpene hydrocarbons not having any conjugated system of double bonds comprise alpha-pinene (B. P. about 153–157° C.), beta pinene (B. P. about 160–168° C.), dipentene (B. P. about 170–178° C.) and its isomers, as d- and l-limonene, and terpinolene (B. P. about 183–185° C.).

The term "terpene hydrocarbon" as used throughout this specification refers solely to those terpene hydrocarbons having the formula $C_{10}H_{16}$, often known as true terpenes or terpenes proper.

As equivalent for the several hydrocarbons in a relatively pure state, terpene cuts relatively rich in the hydrocarbons respectively, may be utilized. Thus, a terpene cut boiling within about the range 150–165° C. will be relatively rich in alpha-pinene. A terpene cut boiling within about the range 160–170° C. will be relatively rich in beta pinene, while also containing some alpha-pinene. A terpene cut boiling within about the range 150–170° C. will be relatively rich in both alpha and beta pinene. A terpene cut boiling within about the range 170–178° C. will be relatively rich in dipentene, while a terpene cut boiling within about the range 182–190° C., will be relatively rich in terpinolene. Terpene cuts relatively rich in the several hydrocarbons not having any conjugated system of double bonds or cuts relatively rich in mixtures thereof will variously contain other terpenes or impurities, which, however, will not effect the carrying out of the process in accordance with this invention for the production of the various products contemplated and which may readily be separated from the final product. Thus, for example, a terpene cut boiling within the range 182–190° C. consisting largely of terpinolene (B. P. 183–185° C.), will contain certain amounts of terpene alcohols, such as fenchyl alcohol and borneol, and also will contain some pinene and some dipentene. Where a terpene cut boiling within about the range 182–190° C. is used, however, the product will largely involve the reaction product of maleic anhydride and terpinolene, with possible admixture of other reaction products in relatively small amount.

In preparing the synthetic resin in accordance with this invention the reagents may be reacted in widely varying proportions depending upon the physical characteristics desired for the resin product with consideration to the use to which it is to be put. Generally speaking, it is desirable to employ maleic anhydride approximately in the proportion necessary to completely satisfy the reactivity of the terpene hydrocarbon or hydrocarbons and the abietic acid. Thus, for example, with use of relatively large amounts of the terpene hydrocarbon the product is soft and tough, with more abietic acid in proportion to the terpene hydrocarbon, the product is hard and brittle and so on, it being clear that by varying the proportions and amounts of the reagents products having varying characteristics may be produced. As illustrative, for example, the terpene hydrocarbon or hydrocarbons may be used within about the range 0.1 to 0.9 mole, maleic anhydride within about the range 0.2 to 2.0 moles and abietic acid within about the range 0.1 to 0.2 mole.

In preparing the improved synthetic resin the reagents will be reacted in the presence of heat. However, it will be expressly understood that any means for effecting the reaction is contemplated as within the scope of this invention. Any suitable temperature may be used, though a temperature within the range say about 125–250° C. is desirable. The reaction will usually be carried out under atmospheric pressure, but with variations of temperature procedure under reduced or super pressure will obviously be within the scope of my invention. The production of the resin in accordance with this invention may be carried out in any suitable apparatus, as any suitable container in which the reagents may be heated. On completion of the reaction any volatile unreacted matter may be removed or separated from the product by the application of a vacuum to the reaction mass before cooling.

As a specific illustration of the practical adaptation of my invention embodying the use of terpinolene, or equivalently a terpene cut boiling at 182°–190° C., 85 parts by weight of terpinolene, 165 parts of abietic acid and 98 parts of maleic anhydride are heated together at a temperature of approximately 200° C. for about 3 hours. The pressure on the reaction mass is then reduced to about 15 mm. of mercury and any unreacted maleic anhydride and the inert ingredients associated with the terpinolene distilled off.

The reaction product obtained by the above procedure will be found to have a direct acid number of about 250, saponification value of about 400, melting point (drop method) of about 100° C. and a rhodanometric iodine value of 10.

As a specific illustration of procedure involving the use of dipentene, or equivalently a terpene cut boiling at 170° C.–178° C., 100 parts by weight of dipentene, 165 parts of abietic acid and 98 parts of maleic anhydride are heated together at a temperature of approximately 200° C. for about 3 hours. The pressure on the reaction mass is then reduced to about 15 mm. of mercury and any unreacted maleic anhydride and the inert ingredients associated with the dipentene are distilled off.

The reaction product obtained by the above procedure will be found to have a direct acid number of about 260, saponification value of about 415, melting point (drop method) of about 95° C. and a rhodanometric iodine value of 23.

As illustrative of procedure in accordance with this invention using alpha-pinene, or equivalently a terpene cut boiling at 150°–165° C., 100 parts by weight of alpha-pinene, 165 parts of abietic acid and 98 parts of maleic anhydride are heated together at a temperature of approximately 200° C. for about 3 hours. The pressure on the reaction mass is then reduced to about 15 mm. of mercury and any unreacted maleic anhydride and the inert ingredients associated with the pinene are distilled off.

The reaction product obtained by the above procedure will be found to have a direct acid number of about 240, saponification value of about 385, melting point (drop method) of about 85° C. and a rhodanometric iodine value of 25.

In place of alpha-pinene, beta-pinene, or equivalently a terpene cut boiling at 160°–170° C. may be used.

As illustrative of various amounts of the several reagents which may be reacted to produce resins in accordance with this invention, for example, the reagents may be reacted in the various proportions given in the following tables:

| Terpinolene | Rosin | Maleic anhydride |
|---|---|---|
| Parts by weight | Parts by weight | Parts by weight |
| 160 | 20 | 98 |
| 150 | 42 | 98 |
| 130 | 83 | 98 |
| 43 | 250 | 98 |

| Dipentene, alphapinene, or betapinene | Rosin | Maleic anhydride |
|---|---|---|
| Parts by weight | Parts by weight | Parts by weight |
| 188 | 20 | 98 |
| 175 | 42 | 98 |
| 150 | 83 | 98 |
| 50 | 250 | 98 |

The several reagents in, for example, the proportion given in the above table may be reacted in any suitable container, at a temperature say within the range 150° C.–250° C. for, say, one to five hours. Volatile unreacted matter may, as has been indicated, be removed on completion of the reaction by reducing the pressure in the reaction mass before cooling.

The product in accordance with this invention will be found to be a highly acidic resin, capable, for example, of reacting with alcohols, as for example, polyhydric alcohols, to yield synthetic gums or resins which have characteristics making them highly desirable for use, for example, in varnishes, lacquers, etc.

As an example of the esterification of the product obtained in one of the specific illustrations above with a polyhydric alcohol the following is illustrative: About 100 parts by weight of the reaction product from terpinolene described above and 58 parts of glycerol are heated at a temperature of 230–240° C. for 6 hours. The resulting resin has an acid value of 40 and a melting point (drop method) of approximately 100° C. It is highly desirable for use in lacquers and varnishes. Various modifying agents such as, for example, drying or semi-drying oils or their acids may be added.

Esterification with monohydric alcohols may likewise be carried out, in the case of low-boiling alcohols preferably under pressure.

It will be understood that in producing the compositions comprising this invention abietic acid as such may be used or rosin, either wood or gum, preferably high in abietic acid content may be used equivalently.

It is also contemplated to use in place of abietic acid other compounds containing the abietyl radical such as, for example, esters of abietic acid with a monohydric or polyhydric alcohol as methyl, ethyl, propyl alcohols, glycol, glycerol, etc. When an ester of abietic acid is employed the acidity of the reaction product is lower due to the fact that one carboxyl group is esterified.

As a specific illustration, for example, of the use of an ester of abietic acid, 85 parts by weight of terpinolene, or equivalently a terpene cut boiling at 182–190° C., 158 parts of methyl abietate and 98 parts of maleic anhydride are heated together at a temperature of about 200° C. for three hours. The pressure is then reduced to 15 mm. of mercury and the excess of maleic anhydride and the inert ingredients associated with the terpinolene are removed.

The acidic resin produced in accordance with this invention may not be completely saturated and, if desired, may be hydrogenated by heating with hydrogen under pressure in the presence of a hydrogenation catalyst, as nickel, platinum, etc.

It will also be understood that maleic acid is contemplated as an operable equivalent of maleic anhydride in the reaction within the scope of this invention and within the purview of the claims hereinafter set forth.

This application is a continuation as to common subject matter of my application, Serial No. 646,982, filed December 13, 1932.

No claim is made in this application to those synthetic resins described herein formed from dipentene or its isomers, since such resins are the invention of and are claimed by Hayward H. Coburn in an application, Serial No. 694,063, filed October 18, 1933.

No claim is made in this application to those synthetic resins described herein formed from alpha or beta pinene, since such resins are the invention of and are claimed by Irvin W. Humphrey in an application, Serial No. 688,988, filed September 11, 1933 now Patent 1,993,036.

What I claim and desire to protect by Letters Patent is:

1. A synthetic resin comprising the product of the simultaneous reaction of a terpene hydrocarbon of the formula $C_{10}H_{16}$ and possessing no conjugated system of double bonds, maleic anhydride, and a compound containing the abietyl radical.

2. A synthetic resin comprising the product of the simultaneous reaction of a terpene hydrocarbon of the formula $C_{10}H_{16}$ and possessing no conjugated system of double bonds, maleic anhydride, and abietic acid.

3. A synthetic resin comprising the product of the simultaneous reaction of a terpene hydrocarbon of the formula $C_{10}H_{16}$ and possessing no conjugated system of double bonds, maleic anhydride, and rosin.

4. A synthetic resin comprising the product of the simultaneous reaction of a terpene hydrocarbon of the formula $C_{10}H_{16}$ and possessing no conjugated system of double bonds, maleic anhydride, and an abietic acid ester.

5. A synthetic resin comprising the product of the simultaneous reaction of terpinolene, maleic anhydride, and a compound containing the abietyl radical.

6. A synthetic resin comprising the product of the simultaneous reaction of terpinolene, maleic anhydride, and abietic acid.

7. A synthetic resin comprising the product of the simultaneous reaction of terpinolene, maleic anhydride, and rosin.

8. A synthetic resin comprising the product of the simultaneous reaction of terpinolene, maleic anhydride, and an abietic acid ester.

9. The method of producing a synthetic resin which includes simultaneously reacting a terpene hydrocarbon of the formula $C_{10}H_{16}$ and possessing no conjugated system of double bonds, maleic anhydride, and a compound containing the abietyl radical, said compound being of a character such that the abietyl radical is available for reaction.

10. The method of producing a synthetic resin which includes simultaneously reacting terpinolene, maleic anhydride, and a compound containing the abietyl radical, said compound being of a character such that the abietyl radical is available for reaction.

11. The method of producing a synthetic resin which includes simultaneously reacting in the presence of heat a terpene hydrocarbon of the formula $C_{10}H_{16}$ and possessing no conjugated system of double bonds, maleic anhydride, and a compound containing the abietyl radical, said compound being of a character such that the abietyl radical is available for reaction.

12. The method of producing a synthetic resin which includes simultaneously reacting in the presence of heat terpinolene, maleic anhydride, and a compound containing the abietyl radical, said compound being of a character such that the abietyl radical is available for reaction.

13. The method of producing a synthetic resin which includes simultaneously reacting at a temperature of about 125°–250° C. a terpene hydrocarbon of the formula $C_{10}H_{16}$ and possessing no conjugated system of double bonds, maleic anhydride, and a compound containing the abietyl radical, said compound being of a character such that the abietyl radical is available for reaction.

14. The method of producing a synthetic resin which includes simultaneously reacting at a temperature of about 125°–250° C. terpinolene, maleic anhydride, and a compound containing the abietyl radical, said compound being of a character such that the abietyl radical is available for reaction.

15. A synthetic resin comprising the product of the simultaneous reaction of a terpene cut containing a terpene hydrocarbon of the formula $C_{10}H_{16}$, and possessing no conjugated system of double bonds with maleic-anhydride, and a compound containing the abietyl radical.

16. A synthetic resin comprising the product of the simultaneous reaction of a terpene cut boiling within the range about 182° C. to about 190° C., maleic anhydride, and a compound containing the abietyl radical.

17. The method of producing a synthetic resin which includes simultaneously reacting a terpene cut containing a terpene hydrocarbon of the formula $C_{10}H_{16}$, and possessing no conjugated system of double bonds with maleic anhydride and a compound containing the abietyl radical, said compound being of a character such that the abietyl radical is available for reaction.

18. The method of producing a synthetic resin which includes simultaneously reacting a terpene cut boiling within the range about 182° C. to about 190° C., maleic anhydride, and a compound containing the abietyl radical, said compound being of a character such that the abietyl radical is available for reaction.

19. The method of producing a synthetic resin which includes simultaneously reacting a terpene hydrocarbon of the formula $C_{10}H_{16}$, and possessing no conjugated system of double bonds with maleic anhydride, and a compound containing the abietyl radical, said compound being of a character such that the abietyl radical is available for reaction, and then hydrogenating the resultant product.

20. A synthetic resin comprising the product of the simultaneous reaction of a terpene hydrocarbon of the formula $C_{10}H_{16}$, and possessing no conjugated system of double bonds, maleic anhydride, and a compound containing the abietyl radical, the unsaturation of the said reaction product being reduced with hydrogen.

21. The method of producing a synthetic resin which includes simultaneously reacting in the presence of heat a terpene hydrocarbon of the formula $C_{10}H_{16}$, and possessing no conjugated system of double bonds with maleic acid, and a compound containing the abietyl radical, said compound being of a character such that the abietyl radical is available for reaction.

ERNEST G. PETERSON.